July 8, 1969   G. H. GEISINGER   3,454,249
TIEDOWN PLATE
Filed Aug. 7, 1967
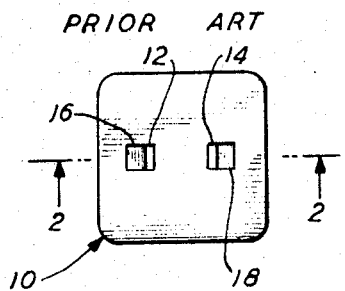
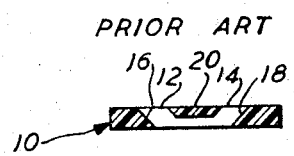
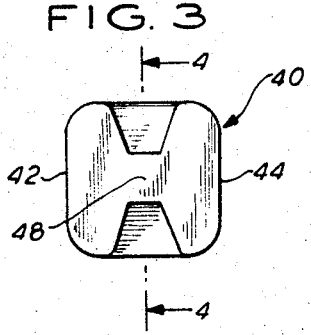
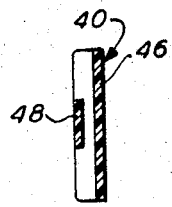
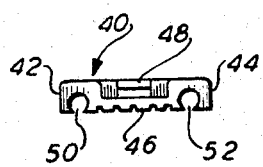
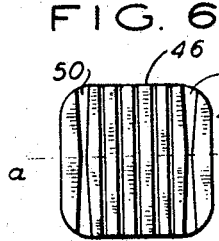
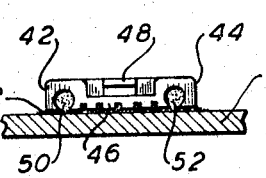
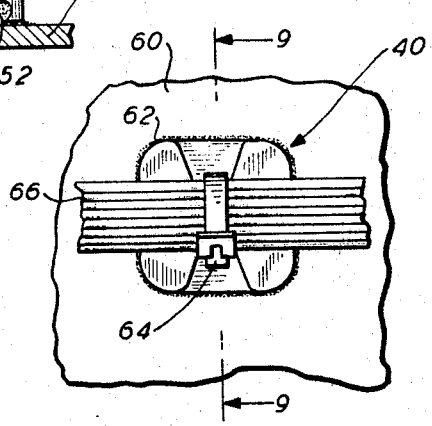
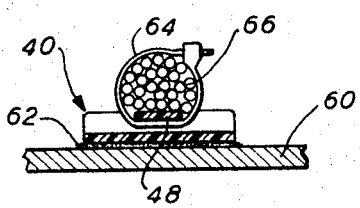
INVENTOR
GEORGE GEISINGER
BY
ATTORNEY

United States Patent Office 3,454,249
Patented July 8, 1969

---

3,454,249
TIEDOWN PLATE
George H. Geisinger, Elizabeth, N.J., assignor to The Thomas & Betts Co., Elizabeth, N.J., a corporation of New Jersey
Filed Aug. 7, 1967, Ser. No. 658,755
Int. Cl. F16l 3/08
U.S. Cl. 248—205                                        9 Claims

ABSTRACT OF THE DISCLOSURE

The invention consists of a tiedown plate to permit the anchoring of wrapped wire bundles or the like to a surface. The tiedown plate consists of a raceway to permit the threading of a cable bundling strap or the like therethrough to both bundle the otherwise loose wires and to fix the bundled wires to the plate. The plate undersurface is formed with two double tapered channels communicating with the bottom of the plate, which channels are narrower at their entrance than anywhere else along their width. The plate undersurface is also scored. Attachment of the plate to a surface is accomplished by the use of an adhesive, such as an epoxy resin which creates a bond between the scored undersurface of the plate and by the action of the adhesive entering the channels and preventing plate movement due to the channel shapes.

BACKGROUND OF THE INVENTION

Field of the invention

The invention relates generally to cable holddown devices wherein it is desired to permit a cable bundling strap, normally used to bundle loose wires into a uniform cable, to also function to hold the bundled wires to a surface along which the wires or cable is to pass. Such devices can be used in any other situation where it is desirable to tie items to a surface or otherwise guide their path, as for example a television antenna lead.

DESCRIPTION OF THE PRIOR ART

A typical prior art tiedown plate is illustrated in FIGS. 1 and 2. This plate is a flat member usually made of nylon or some similar moldable or castable material. It has, as shown in FIG. 2 a raceway with inclined edges leading thereto. A cable bundling strap will be passed down one incline into the raceway and up the other incline and will be fastened about wires (not shown). This form of plate although simple and inexpensive to manufacture is difficult to use. In normal applications, adhesive is placed on the surface upon which the plate is to be mounted and the plate is pressed onto the adhesive. If too much adhesive is used it will tend to fill the raceway making it impossible to insert a cable bundling strap. If the plate is placed on the adhesive with the strap in place it will not be possible to remove or replace the strap. Further, the adhesion of the plate to the surface depends completely on the surface adhesion of the adhesive to the plate which is generally low because of the nylon or similar materials from which the plate is formed.

SUMMARY OF THE INVENTION

The instant invention constructed in accordance with the concepts of the invention obviates all the disadvantages noted above with respect to prior art devices. Namely, there is provided a tiedown plate having a protected raceway for the insertion of a cable bundling strap therein, which is not interfered with by the adhesive used to attach the plate to the receiving surface. This arrangement permits the easy removal of the cable bundling strap and the reinsertion of the same strap or others, as the circumstances require. Further, by a novel arrangement of the tiedown plate the adhesive itself is made an intrical part of the junction between the plate and the receiving surface whereby better adherence between the plate and the receiving surface is achieved than is possible in prior art devices. This is achieved in the following manner: the raceway into which the cable bundling strap enters is completely shielded from the adhesive used to join the plate to the receiving surface, thus, no adhesive can either fill the raceway or cement the strap to the mounting plate itself. Channels, parallel with the bottom surface of the mounting plate and specially tapered both at their entry points and along their lengths permit the entrance of the adhesive material within these channels and thereby provide not only the normal adhesive properties which are possible between the mounting plate and the surface but also an adhesive bond created by the presence of the adhesive in the channels. Further, the presence of the adhesive in these channels act such that relative motion of the plate, with respect to the receiving surface, is not possible. Also, the bottom surface of the plate itself is serrated or scored so as to provide a greater surface for adhesion of the adhesive. The mounting plate may be constructed, as in the preferred embodiment, of a unitary member or may be fabricated from one or more parts. It is therefore an object of this invention to provide an improved tiedown plate.

It is another object of this invention to provide an improved tiedown plate which is simple to manufacture and use.

It is yet another object of this invention to provide an improved tiedown plate which permits cable bundling straps employed therewith to be easily inserted and removed.

It is still another object of this invention to provide an improved tiedown plate which by its novel structure permits the creation of special adhesive bonds which increase the ability of the tiedown plate to remain joined to a receiving surface and which prevents relative movement of said tiedown plate with respect to said receiving surface.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

In the drawings:

FIG. 1 represents a tiedown plate constructed in accordance with concepts widely found in the prior art.

FIG. 2 is a cross-sectional view of the tiedown plate of FIG. 1 taken along the lines 2—2.

FIG. 3 is a plan view of a tiedown plate constructed in accordance with the novel concepts of the invention.

FIG. 4 is a section of the tiedown plate of FIG. 3 taken along the lines 4—4.

FIG. 5 is a front elevation of the novel tiedown plate of FIG. 3.

FIG. 6 is a bottom view of the tiedown plate of FIG. 7.

FIG. 7 shows a front view of the tiedown plate of FIG. 5 mounted to a surface to show the manner in which the adhesive bonds are made.

FIG. 8 is a top view of the novel tiedown plate of the invention showing the cooperation of the tiedown plate, a cable bundling strap and a plurality of wires.

FIG. 9 is a sectional side view of the mounted tiedown plate as shown in FIG. 8 taken along the lines 9—9.

DESCRIPTION OF THE PREFERRED EMBODIMENT

Turning now to FIGS. 1 and 2 there is shown a tiedown plate constructed in accordance with the practices widely found in the prior art. Tiedown plate 10 has an entry aperture 12 and an exit aperture 14 with inclined planes 16 leading to the entry aperture 12 and an inclined plane 18 exiting from the exit aperture 14. As will better be seen in the sectional view of FIG. 2 taken along line 2—2 of FIG. 1, a cable bundling strap will be moved along the incline of plane 16 into the entry aperture 12 under the raceway top 20 and to the exit aperture 14 and along the incline of plane 18. The bottom surface of the tiedown plate 10 has an adhesive placed thereon to permit it to be mounted upon a receiving surface. In that the raceway is open to the bottom surface of the plate 10, it is possible and, as usually occurs, the adhesive is permitted to enter the raceway thus blocking the entry of a cable bundling strap. As an alternative, the cable bundling strap is first inserted into the tiedown plate and then the plate is placed in contact with the adhesive placed on the receiving surface. This will cause the adhesion of the tiedown plate to the receiving surface but will also cause the strap to adhere to the plate thus preventing the removal of the bundling strap at some later time.

Turning now to FIG. 3, there is shown a novel tiedown plate constructed in accordance with the concepts of the invention. The tiedown plate 40 has side walls 42 and 44 which have interior surfaces tapered toward a center line running along the line 4—4. As will be evident from FIGS. 4 and 5 these tapered interior surfaces lead toward the raceway thus permitting ease of entrance of the cable bundling strap from either direction. Turning now to FIG. 4, there is shown a sectional view of the tiedown plate 40 of FIG. 3 taken along the line 4—4. From this view, it is evident that the device has a base member 46, separate and apart from the top member 48, which forms the upper surface of the raceway. Cable bundling straps are entered between the side walls 42 and 44 in their tapered areas and are caused to pass under the top member 48 and above the base member 46 to exit between the similarly tapered side walls 42 and 44. Thus it is evident that adhesive placed on the bottom surface of the base member 46 cannot enter the raceway formed between the base member 46 and the top member 48 thus interfering with either the entry or removal of cable bundling straps passed therebetween.

Turning now to FIG. 5, there is shown a front view of the device of FIG. 3. Each of the side walls 42 and 44 has therein a channel 50 and 52 respectively. It should be noted that these channels are formed in such a manner that their entry position along the plane of the base member 46 is smaller than the width of the remainder of the channels 50 and 52. The reason for this particular taper is as follows: when the tiedown plate 40 is inserted into an adhesive, as is shown in FIG. 7, the adhesive adheres not only to the serrated bottom surface of the base member 46 but also enters the channels 50 and 52 in the side walls 42 and 44. Once the adhesive has been cured, or hardened, it is impossible to remove the tiedown plate 40 from the receiving surface. The reason for this is the larger diameter of the adhesive above the entry point of the channels 50 and 52 which prevents the passage of the entry point of the channels 50 and 52 over this large mass of adhesive. Further, the serrated, or scored bottom surface of the base member 46 provides greater surface for adhesion of the adhesive to the tiedown plate 40.

Turning now to FIG. 6, there is shown a bottom view of the tiedown plate 40. In this figure, the serration, or scoring in the bottom of the base member 46 is visible as are the entry points of the channels 50 and 52. The entry points of the channels 50 and 52 are shown to be doubly tapered towards a center line a—a as shown in FIG. 6. In this manner the opening portions of the channels 50 and 52 towards the top of the figure as well as the opening portions to the channels 50 and 52 at the bottom of the figure, are much wider than the width of the channels 50 and 52 along the line a—a. This configuration is chosen to prevent the plate from being moved in a direction relative to the plane of the receiving surface. It can be seen that with a mass of adhesive in the channels 50 and 52, as shown in FIG. 7 any attempt to move the tiedown plate 40, either towards the top, bottom, left or right of the figure is prevented. With respect to motion towards the top or bottom of the figure, a wedging action takes place towards the narrow point of the channels 50 and 52 at line a—a which will prevent motion of the tiedown plate 40. With respect to movement to the left or right of the figure, the shape of the adhesive within the channels 50 and 52, as is shown in FIG. 5, prevents movement in these directions.

Turning now to FIG. 8, there is shown a top view of the tiedown plate 40 mounted upon a surface 60. The adhesive used to adhere the tiedown plate 40 to the surface 60 has due to normal spreading, caused by the compaction of the tiedown plate 40 into the adhesive spread around and formed an irregular ring 62. However, due to the construction of the raceway, away from the areas of the adhesive, this ring 62 of adhesive will not interfere with the entry of a cable bundling strap 64 shown positioned in the raceway and wrapped about a bundle of wires 66. The cable bundling strap 66 is free to be removed from the raceway of the tiedown plate 40 and can be replaced at will.

FIG. 9 is a side view of the mounted tiedown plate of FIG. 8 taken along the lines 9—9. In this figure it is clearly shown that the adhesive ring 62 in no way interferes with the entrance of the cable bundling strap 64 into the raceway of the tiedown plate 40. Nor does the adhesive ring 62 interfere with the cable bundling strap 64 functioning as a bundling strap for the wire bundle 66.

Although a wide variety of adhesives have been found to operate satisfactorily with the tiedown plate 40, it has been found that adhesives such as epoxy resins are particularly suitable. These resins may be applied in any conventional manner and cured in accordance with manufacturers specifications without interfering or interaction with the tiedown plate 40 itself. Alternatively, if it is desired not to use an adhesive such as an epoxy, a double-faced pressure sensitive material may be first adhered to the bottom edge of the base plate 46 and then adhered to the receiving surface.

Although the description has generally been made in terms of the preferred use as a tiedown plate for cable bundling straps it should be obvious to those skilled in the art that this tiedown plate 40 might be used directly to form a guide-way for wire by inserting them through the raceway and also to form a guide path for such elements as television antenna leads, or similar electrical wires, or as a tiedown for any type of light weight object requiring minimum restraint.

While there have been shown and described and pointed out the fundamental novel features of the invention as applied to the preferred embodiment, it should be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

I claim:

1. A tiedown plate comprising: a relatively plane base member adapted to have an adhesive material placed on its bottom surface; first and second side members affixed to said base member and extending along opposite sides thereof; a top member affixed to said first and second side members and relatively parallel with said base member, forming a raceway between said base member, said top member and said first and second side members; first and second channels, each formed in their respective side members and extending along the length of said respective side member; said channels adapted to receive adhesive materials therein; said channels being open at their respective ends and along the plane of the bottom of said base member; the edges of the opening in each of said channels along the plane of the bottom of said base plate being double tapered towards the center of their length causing said channel openings along the plane of the bottom of said base member to be wider at their ends than their centers whereby relative motion along the plane of the base member is prevented, when said tiedown plate is attached to a surface by adhesive materials entering said channels and extending along the bottom surface of said base member.

2. A tiedown plate as defined in claim 1, wherein the opening of said channels along the plane of the bottom of said base plate is smaller in width than the width of the remaining portions of said channels whereby relative motion perpendicular to the plane of the base member is prevented.

3. A tiedown plate as defined in claim 2, wherein the bottom surface of said base member is serrated to permit greater surface contact with any applied adhesive.

4. A tiedown plate as defined in claim 3, wherein the length of said top member along the length of said first and second side members is less than that of said first and second side members and said first and second side members are tapered towards the position of said top member to provide tapered entries to said raceway.

5. A tiedown plate as defined in claim 4, wherein said base member, said first and second side members and said top member are of unitary construction.

6. A tiedown plate as defined in claim 5, wherein the adhesive employed to attach said tiedown plate to a surface is an epoxy resin.

7. A tiedown plate as defined in claim 6, wherein said base member and said first and second side members form a tiedown plate which is relatively rectangular.

8. A tiedown plate as defined in claim 7, wherein a plane extending along the top of said top member and the tops of said side members is parallel with the plane of the bottom of said base member and said raceway is relatively rectangular.

9. A tiedown plate as defined in claim 8, wherein said channels are of non-uniform cross-section.

References Cited
UNITED STATES PATENTS

| | | | |
|---|---|---|---|
| 1,398,698 | 11/1921 | Lancaster | 52—390 |
| 2,716,383 | 8/1955 | Johnson | 105—369 |
| 2,803,201 | 8/1957 | Johnson | 248—361 X |

CHANCELLOR E. HARRIS, *Primary Examiner.*

U.S. Cl. X.R.

248—74, 361